United States Patent
Penn

(10) Patent No.: US 10,024,365 B2
(45) Date of Patent: Jul. 17, 2018

(54) SUPERCHARGER SPRING LOADED BEARING CARTRIDGE

(71) Applicant: Eaton Corporation, Cleveland, OH (US)

(72) Inventor: Douglas Penn, Rockwood, MI (US)

(73) Assignee: Eaton Corporation, Cleveland, OH (US)

( * ) Notice: Subject to any disclaimer, the term of this patent is extended or adjusted under 35 U.S.C. 154(b) by 6 days.

(21) Appl. No.: 15/228,293

(22) Filed: Aug. 4, 2016

(65) Prior Publication Data
US 2016/0341252 A1 Nov. 24, 2016

Related U.S. Application Data

(63) Continuation of application No. PCT/US2015/014582, filed on Feb. 5, 2015.
(60) Provisional application No. 61/935,915, filed on Feb. 5, 2014.

(51) Int. Cl.
| | | |
|---|---|---|
| F16C 35/06 | (2006.01) | |
| F02B 39/14 | (2006.01) | |
| F16C 25/04 | (2006.01) | |
| F16C 35/067 | (2006.01) | |
| F02B 39/00 | (2006.01) | |

(52) U.S. Cl.
CPC ............ *F16C 35/067* (2013.01); *F02B 39/00* (2013.01); *F02B 39/14* (2013.01); *F16C 25/04* (2013.01); *F16C 2360/22* (2013.01)

(58) Field of Classification Search
CPC .......... F16C 27/04; F16C 25/06; F16C 29/02; F16C 2226/02; F16C 35/067; F16C 2360/22; F01D 25/16–25/168; F05D 2220/40
See application file for complete search history.

(56) References Cited

U.S. PATENT DOCUMENTS

| | | | | |
|---|---|---|---|---|
| 3,890,780 A | * | 6/1975 | Hagemeister | ........... F01D 25/16 184/6.11 |
| 4,708,602 A | * | 11/1987 | McEachern, Jr. | ..... F01D 25/164 384/474 |
| 4,721,441 A | * | 1/1988 | Miyashita | ............. F01D 25/164 384/518 |
| 4,732,495 A | * | 3/1988 | Brandenstein | ........ F16C 25/083 384/518 |
| 5,174,733 A | * | 12/1992 | Yoshikawa | ............... F01D 5/02 416/241 B |

(Continued)

FOREIGN PATENT DOCUMENTS

| | | |
|---|---|---|
| EP | 0168932 A1 | 1/1986 |
| JP | 2013024059 A | 2/2013 |
| WO | 2006122347 A1 | 11/2006 |

OTHER PUBLICATIONS

International Search Report and Written Opinion for International Application No. PCT/US2015/014582 dated May 18, 2015, 12 pages.

*Primary Examiner* — Alan B Waits
(74) *Attorney, Agent, or Firm* — RMCK Law Group PLC

(57) ABSTRACT

A bearing retaining assembly for a supercharger includes a first sleeve, a second sleeve and a biasing member. The bearing retaining assembly rotatably supports an input shaft that rotates about an input shaft axis. The first sleeve can have a counterbore that receives a bearing. The second sleeve can be fixed to a cover of the supercharger. The biasing member can be disposed between the first and second sleeves. The first sleeve can selectively translate along the input shaft axis relative to the second sleeve against the bias of the biasing member.

17 Claims, 4 Drawing Sheets

(56) References Cited

U.S. PATENT DOCUMENTS

| | | | |
|---|---|---|---|
| 5,388,917 A * | 2/1995 | Hibi | B23Q 1/265 384/493 |
| 5,423,405 A | 6/1995 | Fukaya | |
| 5,836,739 A * | 11/1998 | Haramura | F01D 25/168 415/104 |
| 7,371,011 B2 * | 5/2008 | McKeirnan, Jr. | F01D 25/16 384/504 |
| 7,517,154 B2 * | 4/2009 | McKeirnan, Jr. | F01D 25/16 384/517 |
| 8,858,173 B2 * | 10/2014 | Marsal | F04D 29/059 415/229 |
| 8,985,857 B2 * | 3/2015 | Schmidt | F01D 25/125 384/475 |
| 9,062,595 B2 * | 6/2015 | Jones | F02B 39/14 |
| 9,212,698 B2 * | 12/2015 | Schmidt | F01D 25/125 |
| 9,234,542 B2 * | 1/2016 | McKeirnan, Jr. | F01D 25/16 |
| 9,695,708 B2 * | 7/2017 | Hettinger | F01D 25/164 |
| 2007/0183704 A1 * | 8/2007 | Umekawa | F01D 25/16 384/517 |
| 2010/0104233 A1 * | 4/2010 | Bando | F01D 25/16 384/490 |
| 2012/0178561 A1 | 7/2012 | Lafreniere et al. | |
| 2013/0272854 A1 * | 10/2013 | Schmidt | F01D 25/16 415/170.1 |
| 2014/0369865 A1 * | 12/2014 | Marsal | F01D 25/16 417/406 |

\* cited by examiner

FIG.1 *(Prior Art)*

SUPERCHARGER SPRING LOADED BEARING CARTRIDGE

CROSS-REFERENCE TO RELATED APPLICATIONS

This application is a continuation of International Application No. PCT/US2015/014582 filed Feb. 5, 2015, which claims the benefit of U.S. Patent Application No. 61/935,915 filed on Feb. 5, 2014. The disclosures of the above applications are incorporated herein by reference.

FIELD

The present disclosure relates generally to superchargers and more particularly to a bearing retaining configuration on a supercharger.

BACKGROUND

Rotary blowers of the type to which the present disclosure relates are referred to as "superchargers" because they effectively super charge the intake of the engine. One supercharger configuration is generally referred to as a Roots-type blower that transfers volumes of air from an inlet port to an outlet port. A Roots-type blower includes a pair of rotors which must be timed in relationship to each other, and therefore, can be driven by meshed timing gears. Typically, a pulley and belt arrangement for a Roots blower supercharger is sized such that, at any given engine speed, the amount of air being transferred into the intake manifold is greater than the instantaneous displacement of the engine, thus increasing the air pressure within the intake manifold and increasing the power density of the engine.

In some configurations, bearings are disposed between the supercharger case and an input shaft of the supercharger. In some examples, it is desirable to fix the bearing from rotational movement while permitting the bearing to slide axially during operation of the supercharger.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A bearing retaining assembly for a supercharger includes a first sleeve, a second sleeve and a biasing member. The bearing retaining assembly rotatably supports an input shaft that rotates about an input shaft axis. The first sleeve can have a counterbore that receives a bearing. The second sleeve can be fixed to a cover of the supercharger. The biasing member can be disposed between the first and second sleeves. The first sleeve can selectively translate along the input shaft axis relative to the second sleeve against the bias of the biasing member.

According to additional features, one of the first sleeve and the second sleeve includes at least one groove. The other of the first sleeve and the second sleeve includes at least one protrusion. The protrusion can slidably communicate within the groove to maintain the first sleeve rotationally keyed relative to the second sleeve during translation.

According to other features, the biasing member can be captured within a pocket defined between the first and second sleeves. The first sleeve can comprise a first end portion, a second end portion and an intermediate portion. The intermediate portion connects the first and second end portions together. The intermediate portion can be stepped down radially relative to the first end portion. The second end portion can be stepped down relative to the intermediate portion.

According to still other features, the first sleeve can define a pair of first grooves. Each first groove of the pair of first grooves can receive a first o-ring therein. The first o-rings can slidably negotiate along an inner diameter of the cover. The first sleeve can further define a second groove that receives a second o-ring therein. The second o-ring can be configured to slidably negotiate along an inner diameter of the second sleeve. The second sleeve can further define a third groove that receives a third o-ring therein. The third o-ring can be configured to slidably negotiate along an outer diameter of the first sleeve.

A bearing retaining assembly for a supercharger and constructed in accordance to additional features of the present disclosure includes a first sleeve, a second sleeve and a biasing member. The bearing retaining assembly can rotatably support an input shaft that rotates about an input shaft axis. The first sleeve can have a counterbore that receives a bearing. The bearing can have a first portion fixed for rotation to the first sleeve and a second portion fixed for rotation with the input shaft. The second sleeve can be mounted radially around the first sleeve and fixed to a cover of the supercharger. The biasing member can be configured between the first and second sleeve. The first sleeve can selectively translate toward the bearing along the input shaft axis relative to the second sleeve against a bias of the biasing member.

According to other features, the biasing member can be captured within a pocket defined between the first and second sleeves. The first sleeve can comprise a first end portion, a second end portion and an intermediate portion. The intermediate portion can connect the first and second end portions together. The intermediate portion can be stepped down radially relative to the first end portion. The second end portion can be stepped down relative to the intermediate portion.

According to additional features, the first sleeve can further define a pair of first grooves. Each first groove of the pair of first grooves can receive a first o-ring therein. The first o-rings can slidably negotiate along an inner diameter of the cover. The first sleeve can further define a second groove that receives a second o-ring therein. The second o-ring can be configured to slidably negotiate along an inner diameter of the second sleeve.

In other features, the second sleeve can further define a third groove that receives a third o-ring therein. The third o-ring can be configured to slidably negotiate along an outer diameter of the first sleeve. One of the first sleeve and the second sleeve can include at least one groove. The other of the first sleeve and the second sleeve can include at least one protrusion. The protrusion can slidably communicate within the groove to maintain the first sleeve rotationally keyed relative to the second sleeve during translation.

A bearing retaining assembly for a supercharger and constructed in accordance to another example of the present disclosure includes a first sleeve, a second sleeve and a biasing member. The bearing retaining assembly can rotatably support an input shaft that rotates about an input shaft axis. The first sleeve can have a counterbore that receives a bearing. The bearing can have an outer race fixed for rotation to the first sleeve and an outer race fixed for rotation with the input shaft. The first sleeve can further include a radial collar. The second sleeve can be mounted radially around the first sleeve and fixed to a cover of the supercharger. The second sleeve can be axially keyed to the first sleeve. The second sleeve can further include a radial end surface that opposes the radial collar of the first sleeve. The biasing member can be configured between the first and second sleeves. The biasing member can have a first end mounted against the radial collar and a second end mounted against the radial end surface. The first sleeve can selectively translate toward the bearing along the input shaft axis relative to the second sleeve against the bias of the biasing member.

According to other features, the biasing member can be captured within a pocket defined between the first and second sleeves and that encloses the biasing member. One of the first sleeve and the second sleeve can include at least one groove. The other of the first sleeve and the second sleeve can include at least one protrusion. The protrusion can slidably communicate within the groove to maintain the first sleeve rotationally keyed relative to the second sleeve during translation.

BRIEF DESCRIPTION OF THE DRAWINGS

The present disclosure will become more fully understood from the detailed description and the accompanying drawings, wherein.

DETAILED DESCRIPTION

Figure 1:
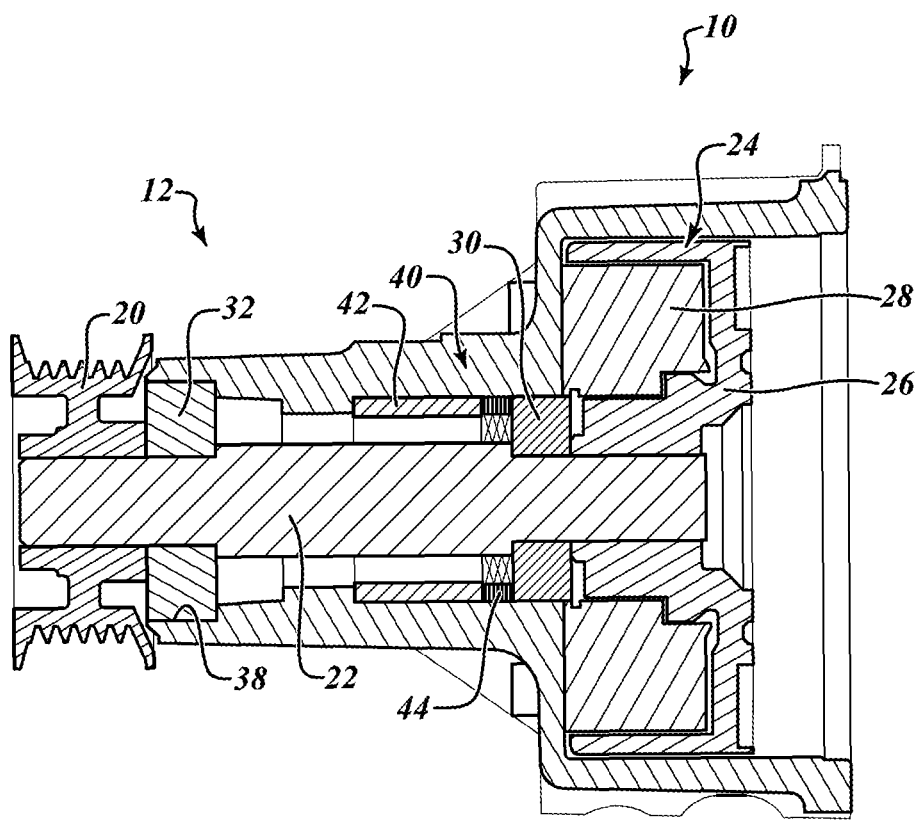
FIG. 1 is a cross-sectional view of a portion of a supercharger according to prior art.

With initial reference to FIG. 1, a partial cross-sectional illustration of an exemplary Roots-type blower or supercharger 10 according to one prior art configuration is shown. The supercharger 10 includes a pulley housing portion or cover 12 having a pulley hub 20 fixed for rotation with an input shaft 22. A clutch 24 can be arranged in the cover 22. The clutch 24 can include a clutch rotor 26, a clutch coil 28 and a clutch armature (not specifically shown). The clutch rotor 26 can be configured to be magnetized and set up a magnetic loop that attracts the clutch armature.

The cover 12 can generally be formed from a casting. The input shaft 22 can be supported by a first bearing 30 and a second bearing 32. The first and second bearings 30 and 32 can each include an inner race that rotates with the input shaft 22. The second bearing 32 can have an outer race that is fixed with an inner diameter 38 of the cover 12. A bearing retaining assembly 40 is configured adjacent the first bearing 30. The bearing retaining assembly 40 can include a sleeve 42 and a biasing member 44.

In some examples, engagement of the clutch 24 can encourage misalignment between components in the cover 12 including the first bearing 30. In one configuration, the first bearing 30 is permitted to move axially toward and away from the biasing member 44. The biasing member 44 can act against the sleeve 42 to absorb some of the axial movement as well as mitigate some of the noise emitted during engagement of the clutch 24.

Figure 2:
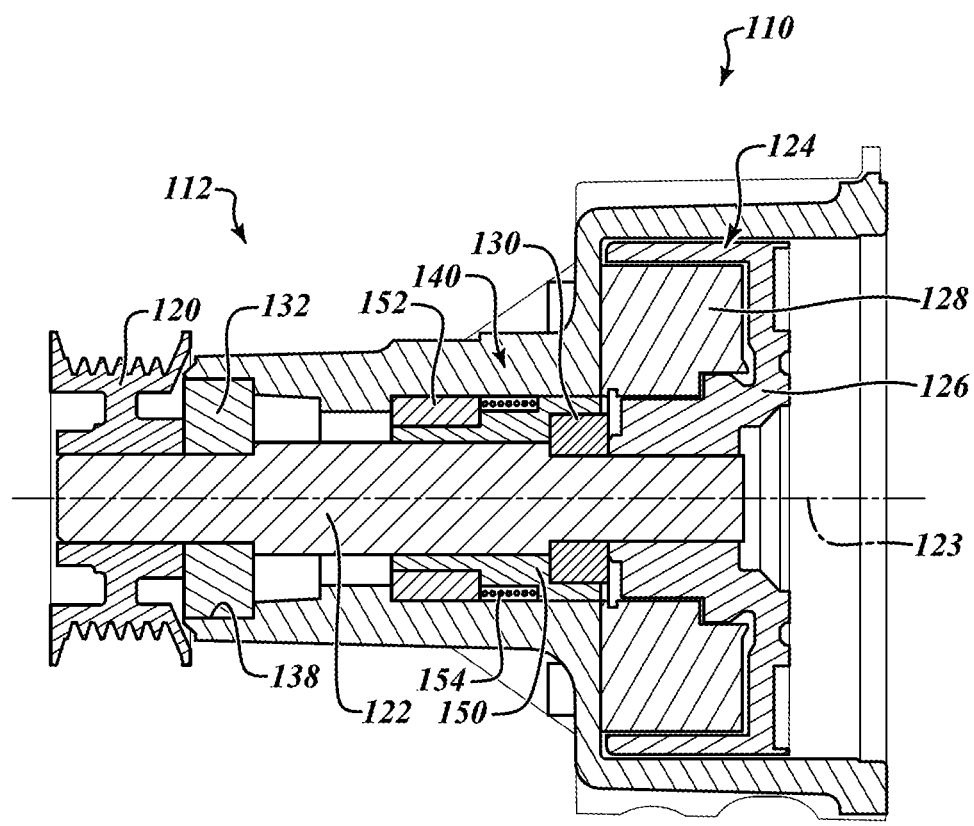
FIG. 2 is a cross-sectional view of a portion of a supercharger incorporating a bearing retaining assembly according to one example of the present disclosure.

Turning now to FIG. 2, a partial cross-sectional illustration of an exemplary Roots-type blower or supercharger 110 according to one example of the present disclosure is shown. The supercharger 110 includes a pulley housing portion or cover 112 having a pulley hub 120 fixed for rotation with an input shaft 122. The input shaft 122 extends along and rotates about an input shaft axis 123. A clutch 124 can be arranged in the cover 112. The clutch 124 can include a clutch rotor 126, a clutch coil 128 and a clutch armature (not specifically shown). The clutch rotor 126 can be configured to be magnetized and set up a magnetic loop that attracts the clutch armature.

The cover 112 can generally be formed from a casting. The input shaft 122 can be supported by a first bearing 130 and a second bearing 132. The second bearing 132 can include an inner race that rotates with the input shaft 122 and an outer race that is fixed with an inner diameter 138 of the cover 112.

A bearing retaining assembly 140 is configured adjacent the first bearing 130. The bearing retaining assembly 140 can include a first sleeve 150, a second sleeve 152 and a biasing member 154. As will become appreciated from the following discussion, the first sleeve 150 is permitted to slide axially along the input shaft axis 123 against the bias of biasing member 154 relative to the second sleeve 152. In this regard, the second sleeve 152 is fixed to the inner diameter 138 of the cover 112. The first bearing 130 has an inner race fixed for rotation with the input shaft 122 and an outer race rotationally fixed to the first sleeve 150.

Figure 3:
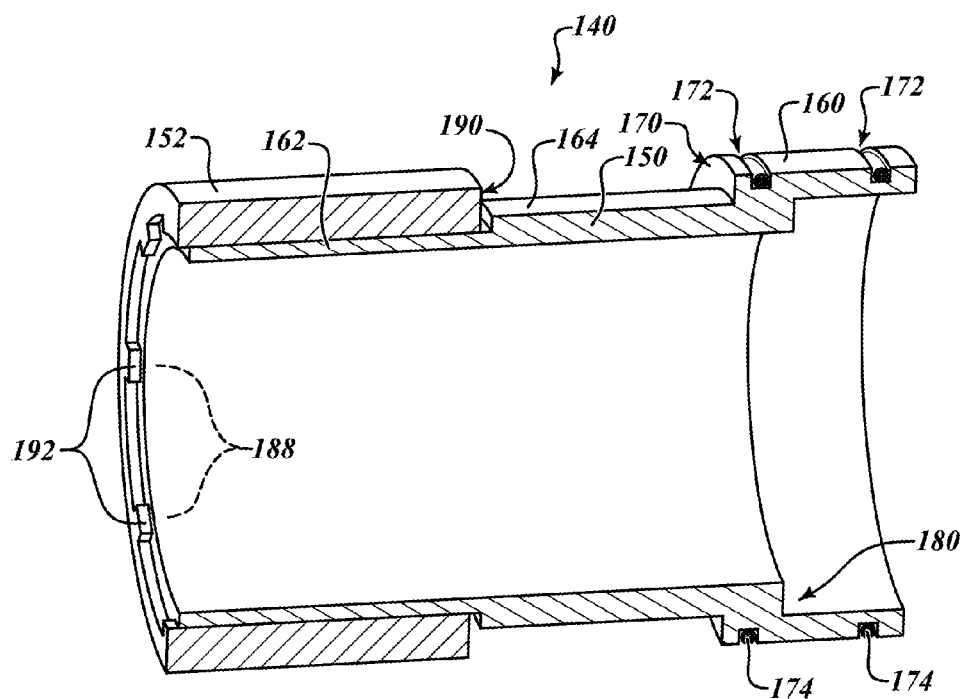
FIG. 3 is a cross-sectional view of the bearing retaining assembly of FIG. 2.

With particular reference now to FIG. 3, the bearing retaining assembly 140 will be described in greater detail. For illustrative purposes, the biasing member 154 (FIG. 2) is removed for clarity. The first sleeve 150 can generally include a first end portion 160, a second end portion 162 and an intermediate portion 164. The intermediate portion 164 can connect the first and second end portions 160 and 162. In the example shown, the intermediate portion 164 can be radially stepped down relative to the first end portion 160 and the second end portion 162 can be radially stepped down relative to the intermediate portion 164. The first end portion 160 can include a radial collar 170 and a pair of grooves 172. In the example shown, the radial collar 170 has a surface that is generally perpendicular to an axis of the bearing retaining assembly 140 (or relative to the axis 123). The grooves 172 can receive compliant members such as o-rings 174 therein. The o-rings can be configured to slidably negotiate (with the first sleeve 150) along the opposing inner diameter 138 of the cover 112 and along the axis 123 (FIG. 2). A counterbore 180 can be defined on an inner diameter of the first sleeve 150. The counterbore 180 can be dimensioned to nestingly receive the first bearing 130 (see also FIG. 2). The second end portion 162 can define a plurality of longitudinal grooves 188 formed therealong.

With continued reference to FIG. 3, the second sleeve 152 will be described. The second sleeve 152 can generally include a radial end surface 190 and a corresponding plurality of longitudinal protrusions 192. The radial end surface 190 generally opposes the radial collar 170 of the first sleeve 150. The biasing member 154 (FIG. 2) is generally wrapped around the intermediate portion 164 of the first sleeve 150 having one end positioned against the radial collar 170 and an opposite end positioned against the radial end surface 190. The longitudinal protrusions 192 can be configured to be received by the plurality of longitudinal grooves 188 of the first sleeve 150. It will be appreciated that other structures or geometries may be provided for the grooves 188 and protrusions 192 for allowing slidable relative axial communication. Further it will be appreciated that some (or all) of the protrusions may be configured on the first sleeve 150 while some (or all) of the grooves may be configured on the second sleeve 152.

The biasing member 154 is shown as a coil spring. It will be appreciated that additional and/or other biasing members may be used. The biasing member 154 can be configured to be biased between the radial collar 170 and the radial end surface 190. During use, the first sleeve member 150 is permitted to move axially toward and away from the second sleeve 152 (while the second sleeve 152 remains axially fixed relative to the cover 112). During the axial movement, the protrusions 192 and grooves 188 cooperate to maintain the first sleeve 150 rotationally keyed relative to the second sleeve 152. The first and second sleeves 150, 152 are axially keyed to each other.

Figure 4:
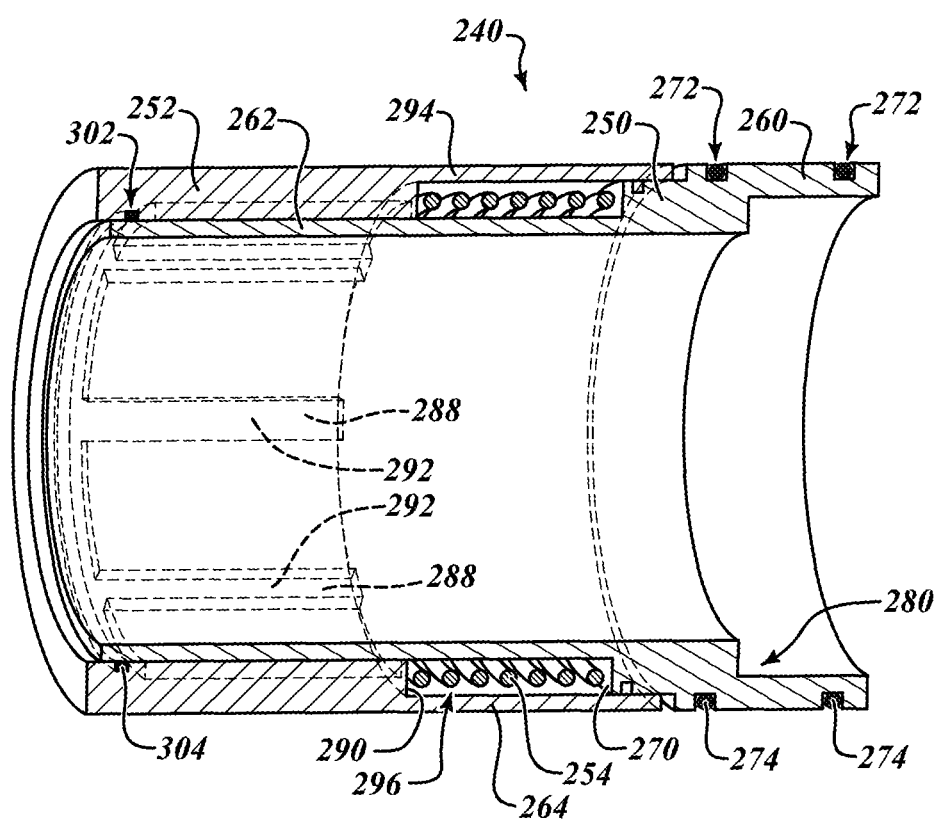
FIG. 4 is a cross-sectional view of a bearing retaining assembly constructed in accordance to another example of the present disclosure.

With particular reference now to FIG. 4, a bearing retaining assembly 240 constructed in accordance to additional features of the present disclosure will be described in greater detail. The bearing retaining assembly 240 can include a first sleeve 250, a second sleeve 252 and a biasing member 254. In this configuration, the biasing member 254 is sealingly contained within a pocket formed between the first and second sleeves 250 and 252. As will become appreciated from the following discussion, the first sleeve 250 is permitted to slide axially against the bias of biasing member 254 relative to the second sleeve 252. In this regard, the second sleeve 252 is fixed to the inner diameter 138 of the cover 112 (see FIG. 2). The first bearing 130 has an inner race fixed for rotation with the input shaft 122 and an outer race rotationally fixed to the first sleeve 250.

The first sleeve 250 can generally include a first end portion 260, a second end portion 262 and an intermediate portion 264. The intermediate portion 264 can connect the first and second end portions 260 and 262. In the example shown, the intermediate portion 264 can be radially stepped down relative to the first end portion 260. The first end portion 260 can include a radial collar 270 and a pair of grooves 272. In the example shown, the radial collar 270 has a surface that is generally perpendicular to an axis of the bearing retaining assembly 240. The grooves 272 can receive compliant members such as o-rings 274 therein. The o-rings can be configured to slidably negotiate (with the first sleeve 250) along the opposing inner diameter 138 of the cover 112 (see FIG. 2). A counterbore 280 can be defined on an inner diameter of the first sleeve 250. The counterbore 280 can be dimensioned to nestingly receive the first bearing 230 (see also FIG. 2). The second end portion 262 can define a plurality of longitudinal grooves 288 formed therealong.

With continued reference to FIG. 4, the second sleeve 252 will be described. The second sleeve 252 can generally include a radial end surface 290 and a corresponding plurality of longitudinal protrusions 292. The biasing member 254 is generally wrapped around the intermediate portion 264 of the first sleeve 250 having one end positioned against the radial collar 270 and an opposite end positioned against the radial end surface 290. A radial flange 294 can create a pocket 296 with the first sleeve 250 for receiving the biasing member 254. The longitudinal protrusions 292 can be configured to be received by the plurality of longitudinal grooves 288 of the first sleeve 250. The first and second sleeves 250, 252 therefore are axially keyed to each other. It will be appreciated that other structures or geometries may be provided for the grooves 288 and protrusions 292 for allowing slidable relative axial communication. Further it will be appreciated that some (or all) of the protrusions may be configured on the first sleeve 250 while some (or all) of the grooves may be configured on the second sleeve 252.

A groove 302 can be defined on the second sleeve 252 that receives an o-ring 304 therein. The o-ring 304 can slidably negotiate along an outer diameter of the second end portion 262 of the first sleeve 250. A groove 312 can be defined on the first sleeve 250 that receives an o-ring 314 therein. The o-ring 314 can slidably negotiate along an inner diameter of the second sleeve 252. Other configurations are contemplated.

The biasing member 254 is shown as a coil spring. It will be appreciated that additional and/or other biasing members may be used. The biasing member 254 can be configured to be biased between the radial collar 270 and the radial end surface 290. During use, the first sleeve member 250 is permitted to move axially (along axis 123, FIG. 2) toward and away from the second sleeve 252 (while the second sleeve 252 remains axially fixed relative to the cover 112). During the axial movement, the protrusions 292 and grooves 288 cooperate to maintain the first sleeve 250 rotationally keyed relative to the second sleeve 252.

The foregoing description of the examples has been provided for purposes of illustration and description. It is not intended to be exhaustive or to limit the disclosure. Individual elements or features of a particular example are generally not limited to that particular example, but, where applicable, are interchangeable and can be used in a selected example, even if not specifically shown or described. The same may also be varied in many ways. Such variations are not to be regarded as a departure from the disclosure, and all such modifications are intended to be included within the scope of the disclosure.

What is claimed is:

1. A bearing retaining assembly for a supercharger, the bearing retaining assembly rotatably supporting an input shaft that rotates about an input shaft axis, the bearing retaining assembly comprising:
    a first sleeve having a counterbore that receives a bearing;
    a second sleeve fixed to a cover of the supercharger;
    a biasing member disposed between the first and second sleeves; and
    wherein the first sleeve selectively translates along the input shaft axis relative to the second sleeve against a bias of the biasing member, wherein one of the first sleeve and the second sleeve includes at least one groove and wherein the other of the first sleeve and the second sleeve includes at least one protrusion, wherein the protrusion slidably communicates within the groove to maintain the first sleeve rotationally keyed relative to the second sleeve during the translation.

2. The bearing retaining assembly of claim 1 wherein the biasing member is captured within a pocket defined between the first and second sleeves.

3. The bearing retaining assembly of claim 1 wherein the first sleeve comprises a first end portion, a second end portion and an intermediate portion wherein the intermediate portion connects the first and second end portions together.

4. The bearing retaining assembly of claim 3 wherein the intermediate portion is stepped down radially relative to the first end portion and wherein the second end portion is stepped down relative to the intermediate portion.

5. The bearing retaining assembly of claim 1 wherein the first sleeve defines a pair of first grooves, wherein each first groove of the pair of first grooves receives a first o-ring therein.

6. The bearing retaining assembly of claim 5 wherein the first o-rings slidably negotiate along an inner diameter of the cover.

7. The bearing retaining assembly of claim 6 wherein the first sleeve further defines a second groove that receives a second o-ring therein, wherein the second o-ring is configured to slidably negotiate along an inner diameter of the second sleeve.

8. The bearing retaining assembly of claim 7 wherein the second sleeve further defines a third groove that receives a third o-ring therein, wherein the third o-ring is configured to slidably negotiate along an outer diameter of the first sleeve.

9. A bearing retaining assembly for a supercharger, the bearing retaining assembly rotatably supporting an input shaft that rotates about an input shaft axis, the bearing retaining assembly comprising:
 a first sleeve having a counterbore that receives a bearing, the bearing having a first portion fixed for rotation to the first sleeve and a second portion fixed for rotation with the input shaft, wherein the first sleeve defines a pair of first grooves, wherein each first groove of the pair of first grooves receives a first o-ring therein wherein the first o-rings slidably negotiate along an inner diameter of the cover;
 a second sleeve mounted radially around the first sleeve and fixed to a cover of the supercharger;
 a biasing member configured between the first and second sleeves; and
 wherein the first sleeve selectively translates toward the bearing along the input shaft axis relative to the second sleeve against a bias of the biasing member, wherein the first sleeve further defines a second groove that receives a second o-ring therein, wherein the second o-ring is configured to slidably negotiate along an inner diameter of the second sleeve.

10. The bearing retaining assembly of claim 9 wherein the biasing member is captured within a pocket defined between the first and second sleeves.

11. The bearing retaining assembly of claim 9 wherein the first sleeve comprises a first end portion, a second end portion and an intermediate portion wherein the intermediate portion connects the first and second end portions together.

12. The bearing retaining assembly of claim 11 wherein the intermediate portion is stepped down radially relative to the first end portion and wherein the second end portion is stepped down relative to the intermediate portion.

13. The bearing retaining assembly of claim 9 wherein the second sleeve further defines a third groove that receives a third o-ring therein, wherein the third o-ring is configured to slidably negotiate along an outer diameter of the first sleeve.

14. The bearing retaining assembly of claim 9 wherein one of the first sleeve and the second sleeve includes at least one groove and wherein the other of the first sleeve and the second sleeve includes at least one protrusion, wherein the protrusion slidably communicates within the groove to maintain the first sleeve rotationally keyed relative to the second sleeve during the translation.

15. A bearing retaining assembly for a supercharger, the bearing retaining assembly rotatably supporting an input shaft that rotates about an input shaft axis, the bearing retaining assembly comprising:
 a first sleeve having a counterbore that receives a bearing, the bearing having an outer race fixed for rotation to the first sleeve and an inner race fixed for rotation with the input shaft, the first sleeve further including a radial collar;
 a second sleeve mounted radially around the first sleeve and fixed to a cover of the supercharger, the second sleeve axially keyed to the first sleeve, the second sleeve further including a radial end surface that opposes the radial collar of the first sleeve;
 a biasing member configured between the first and second sleeves, the biasing member having a first end mounted against the radial collar and a second end mounted against the radial end surface; and
 wherein the first sleeve selectively translates toward the bearing along the input shaft axis relative to the second sleeve against a bias of the biasing member.

16. The bearing retaining assembly of claim 15 wherein the biasing member is captured within a pocket defined between the first and second sleeves and that encloses the biasing member.

17. The bearing retaining assembly of claim 15 wherein one of the first sleeve and the second sleeve includes at least one groove and wherein the other of the first sleeve and the second sleeve includes at least one protrusion, wherein the protrusion slidably communicates within the groove to maintain the first and second sleeves rotationally keyed relative to each other during the translation.

* * * * *